(12) United States Patent
Morford

(10) Patent No.: US 9,573,612 B2
(45) Date of Patent: Feb. 21, 2017

(54) SHOPPING CART CHILD SAFETY RESTRAINT DEVICE

(71) Applicant: Marvin Morford, West Des Moines, IA (US)

(72) Inventor: Marvin Morford, West Des Moines, IA (US)

( * ) Notice: Subject to any disclaimer, the term of this patent is extended or adjusted under 35 U.S.C. 154(b) by 154 days.

(21) Appl. No.: 14/875,830

(22) Filed: Oct. 6, 2015

(65) Prior Publication Data
US 2016/0046311 A1    Feb. 18, 2016

Related U.S. Application Data

(63) Continuation-in-part of application No. 14/231,046, filed on Mar. 31, 2014, now Pat. No. 9,187,112.

(60) Provisional application No. 61/807,850, filed on Apr. 3, 2013.

(51) Int. Cl.
*A47D 1/10*     (2006.01)
*B62B 3/14*     (2006.01)

(52) U.S. Cl.
CPC ................... *B62B 3/1452* (2013.01)

(58) Field of Classification Search
CPC .................................................. B62B 3/1452
USPC .................... 297/256.17, 464, 466, 467, 487
See application file for complete search history.

(56) References Cited

U.S. PATENT DOCUMENTS

| | | | | |
|---|---|---|---|---|
| 2,552,720 A | * | 5/1951 | Keough | A47D 1/008 297/151 |
| 2,858,882 A | * | 11/1958 | Personett | A47D 1/008 297/467 |
| 4,568,125 A | * | 2/1986 | Sckolnik | A47D 1/103 297/467 X |
| 4,819,988 A | * | 4/1989 | Hellstrom | A47D 15/006 297/467 |
| 5,203,612 A | * | 4/1993 | Pokrzywinski | A47D 15/006 297/466 |
| 5,641,200 A | * | 6/1997 | Howell | B62B 3/144 297/256.17 X |
| 5,651,557 A | * | 7/1997 | De Stefano | B62B 3/144 297/256.17 X |
| 6,832,767 B1 | * | 12/2004 | Sandvik | B62B 3/144 297/256.17 X |
| 9,187,112 B2 | * | 11/2015 | Morford | B62B 3/1452 |
| 2005/0156394 A1 | * | 7/2005 | Sandvik | B62B 3/144 280/33.993 |
| 2011/0115176 A1 | * | 5/2011 | Giampavolo | B62B 3/144 297/256.17 X |

* cited by examiner

*Primary Examiner* — Rodney B White
(74) *Attorney, Agent, or Firm* — McKee, Voorhees & Sease, PLC

(57) ABSTRACT

A shopping cart child safety lock system.
It includes a support post locked to a shopping cart with slideable and lockable yoke to restrain and then release a child's thighs.

4 Claims, 10 Drawing Sheets

SHOPPING CART CHILD SAFETY RESTRAINT DEVICE

CROSS-REFERENCE TO RELATED APPLICATIONS

This application is a continuation-in-part of Ser. No. 14/231,046, filed Mar. 31, 2014, now U.S. Pat. No. 9,187,112 claiming priority under 35 U.S.C. §119 to provisional application Ser. No. 61/807,850 filed Apr. 3, 2013, both herein incorporated by reference in their entirety.

BACKGROUND OF THE INVENTION

This invention relates to a child restraining device that is inexpensive and can be used with most general use shopping carts.

One of the problems inherent in the use of child restraint seats of various design and more particularly, in restraining children from standing or dangerously leaning over the side of shopping carts, is that of adequately restraining the child in the seating position for which the shopping cart was designed. Conventional shopping carts are usually designed with a seating area for children, which seating area is defined by parallel side grids and parallel front and rear grids, with leg openings provided in the front grid for receiving the child in seating position facing the operator of the shopping cart. However, there is usually no restraint system provided in shopping carts to maintain the child in this seated position and while the operator is shopping, or while his or her attention is diverted to other things, the child may easily stand or lean over the side of the shopping cart and fall from the seating area to the floor. This is particularly true of active children that must be watched at all times. Some shopping carts are fitted with a single seat belt attachment which is similar to the seat belt in an automobile and has a conventional buckle for strapping the belt over the lap of the child. However, many children, and particularly those who are active, are able to quickly and easily extricate themselves from the seat belt and risk falling over the side of the shopping cart as if the seat belt were not in place.

To resolve the above problem it has been common in the art to develop a variety of special seats which use seat belt type strap arrangements. The problems with these are several fold. First, the straps are often gangling, unsightly, get twists, and are easily soiled. As a result, parents frequently simply ignore the straps and do not secure the child.

Moreover, units that use separate infant seats, much like those used in cars, are so expensive as to be impractical for the stores to purchase and provide. As a result, many simply resort to the shopping cart built-in seat without any restraint system.

This is potentially dangerous. Current literature reports that there are more than an estimated 20,000 children under age 5 injured by shopping carts each year. In addition, children 3 and younger account for the majority of these shopping cart injuries. Those children of such tender age are the ones that especially need successful restraint.

It is common knowledge that children can suffer cuts, bruises, fractures, concussions, and even internal injuries when the jump or fall from a shopping cart. They also can get pinched in the folding mechanism or they can fall against the cart itself, especially if they are hit by another cart. Falls from shopping carts are among the leading causes of head injuries in young children. As a result, there is a continuing need which must balance practical economics and safety. It must be done by a cart that is user friendly, which has a restraining device that is appealing to use but one which is child proof and one which doesn't cost a fortune to make.

The present invention has as its primary objective the provision of a cart which avoids the use of straps and avoids the use of cumbersome expensive seats. It improves on my earlier filed parent case by simplifying the structure by elimination of the separate seating element.

SUMMARY OF THE INVENTION

These and other objects of the invention are achieved by a shopping cart child safety device that comprises a support post having a yoke adjustably connected to the vertical support post for adjustable movement up and down to lock across an infant's thighs which yoke can be released for the child to be removed from the cart. The device itself is releasably fastened to the cart in the area normally designed for child seating.

DETAILED DESCRIPTION OF THE PREFERRED EMBODIMENTS

Figure 1:
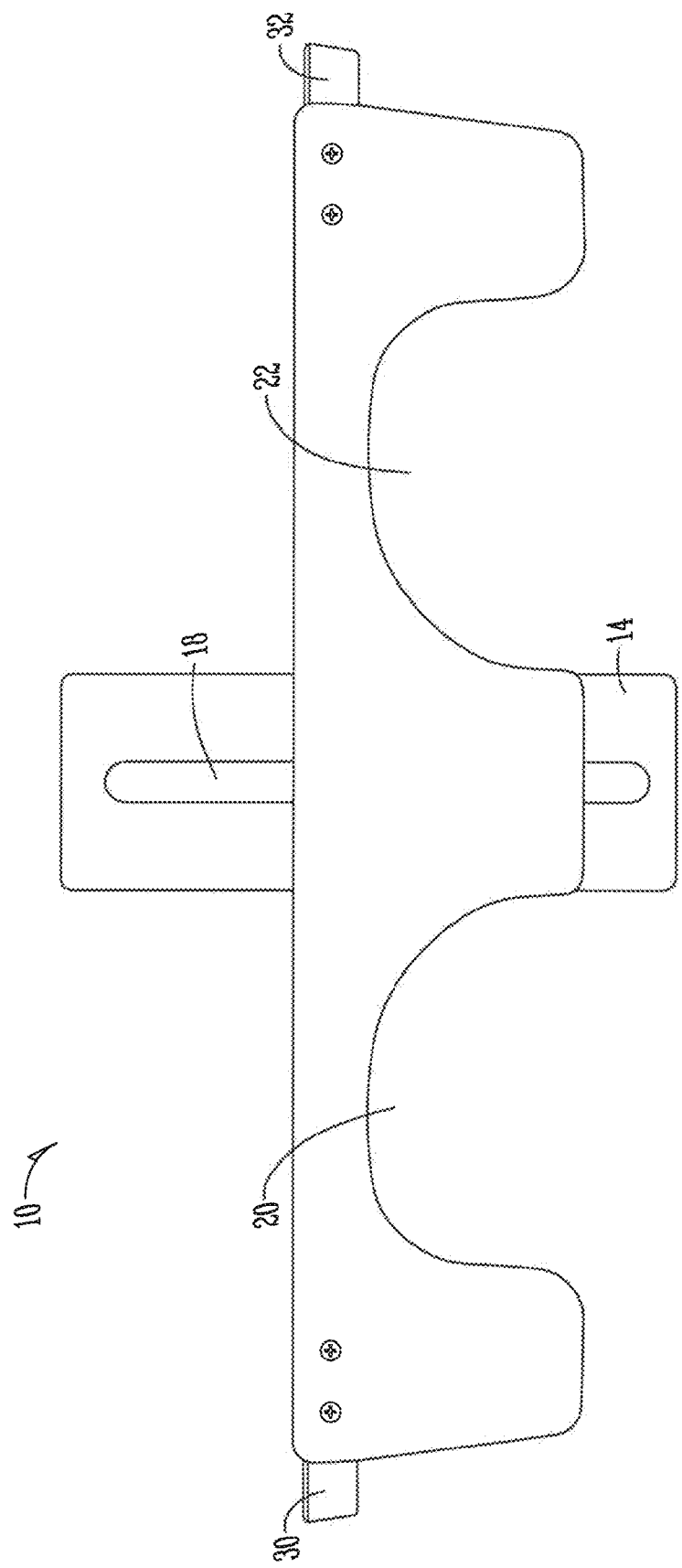
FIG. 1 is a front view of the safety device with thigh yoke down.
Figure 2:
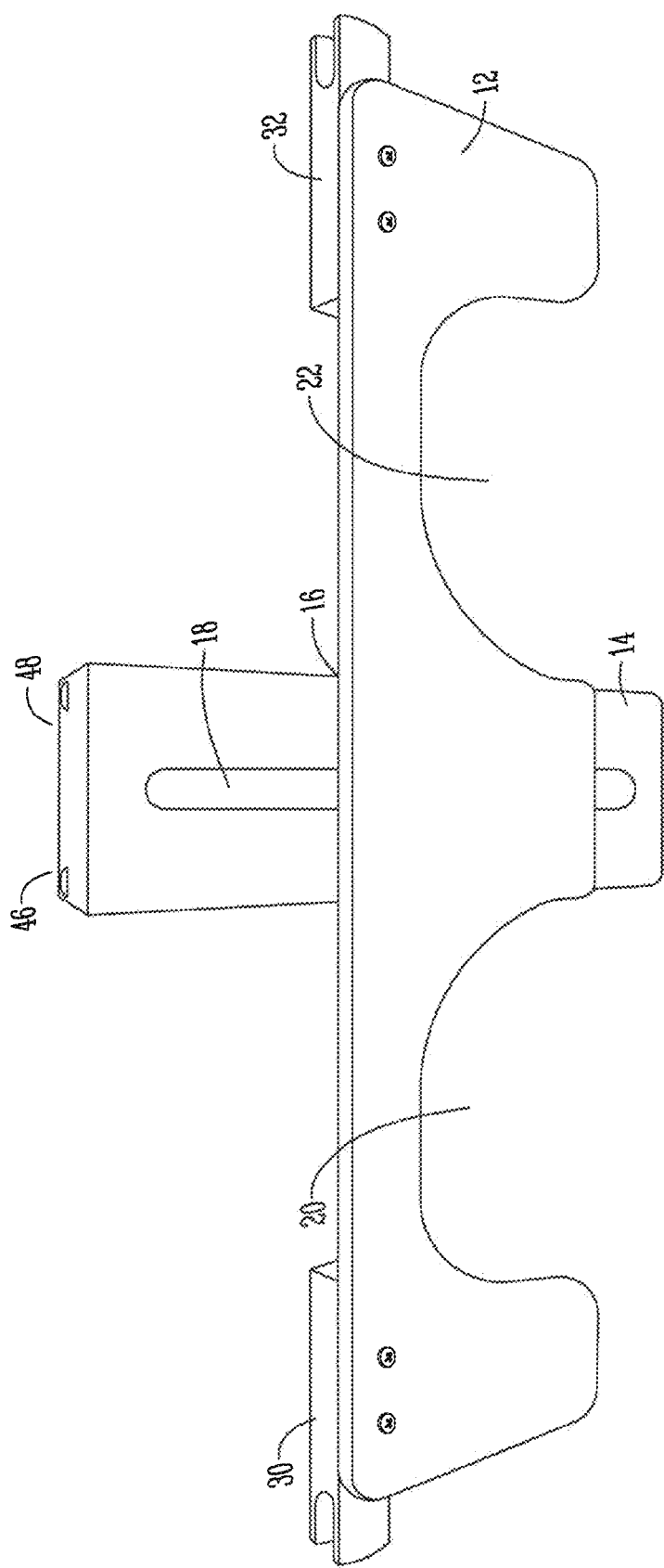
FIG. 2 is a front perspective view with thigh yoke down.
Figure 3:
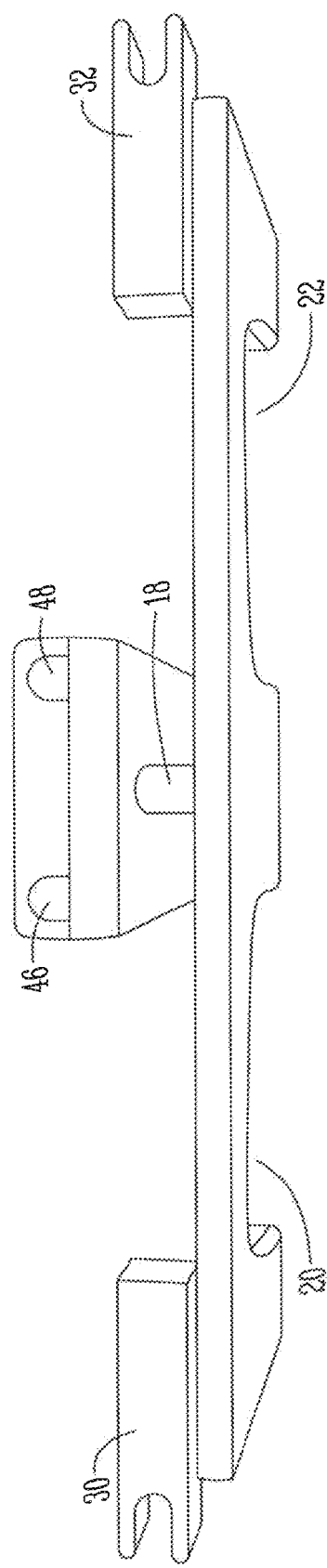
FIG. 3 is a plan view of the safety device.
Figure 4:
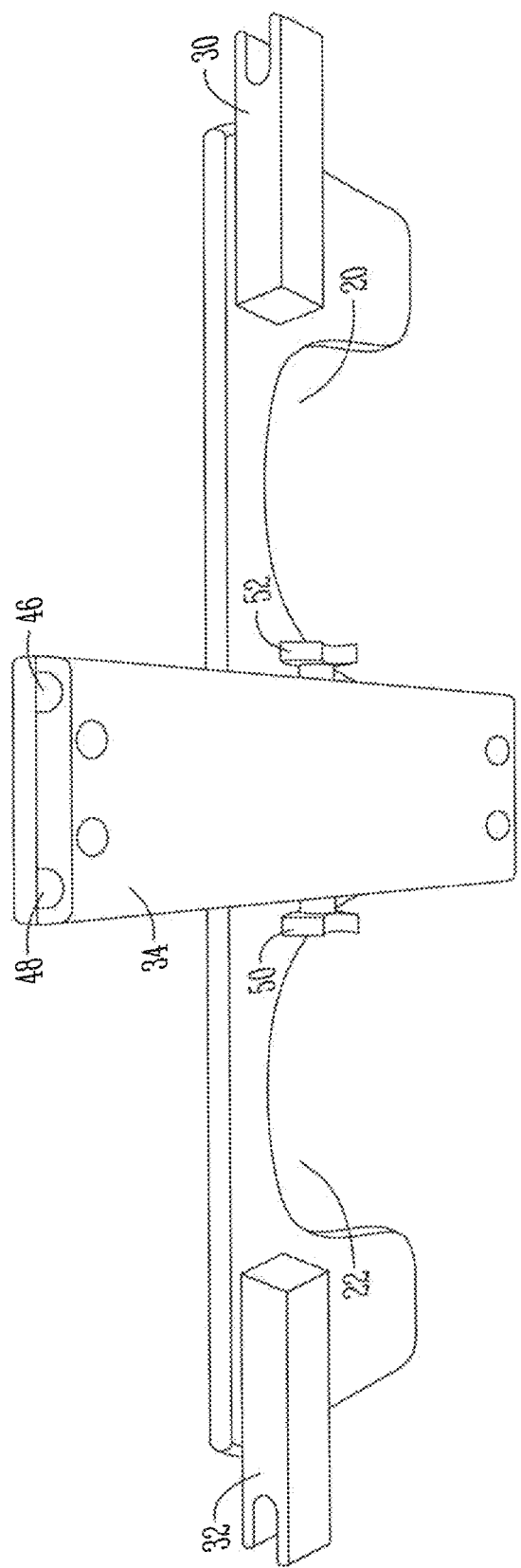
FIG. 4 is a rear perspective view of the safety device.
Figure 5:
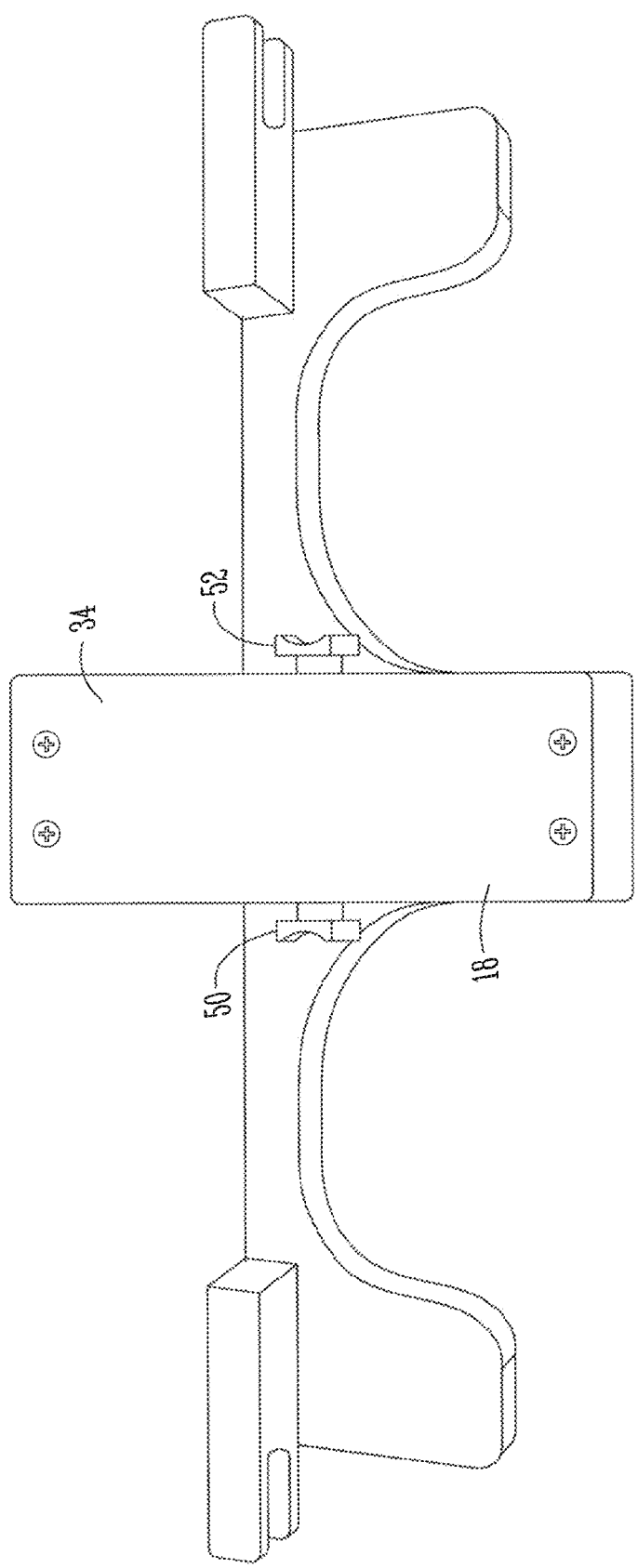
FIG. 5 is a plan view of the yoke post down.
Figure 6:
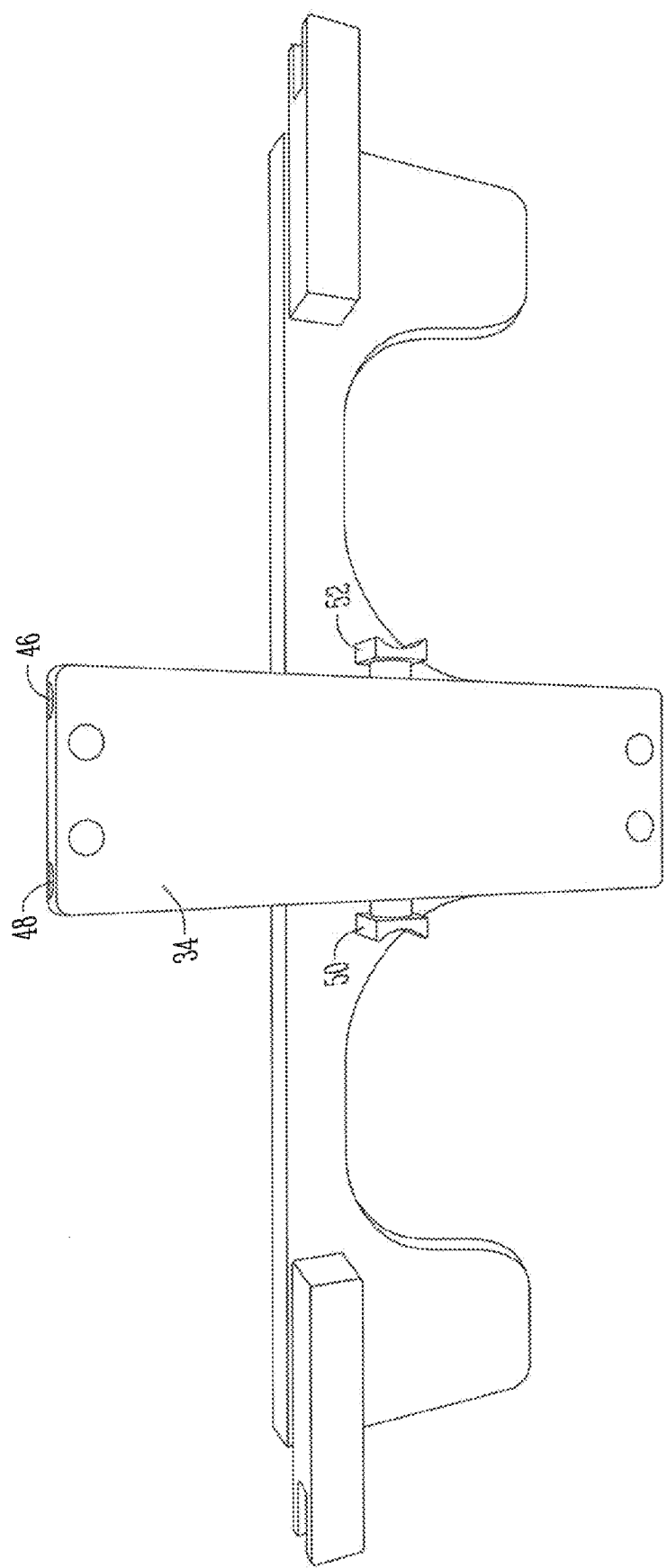
FIG. 6 is a rear view with yoke post up.
Figure 7:
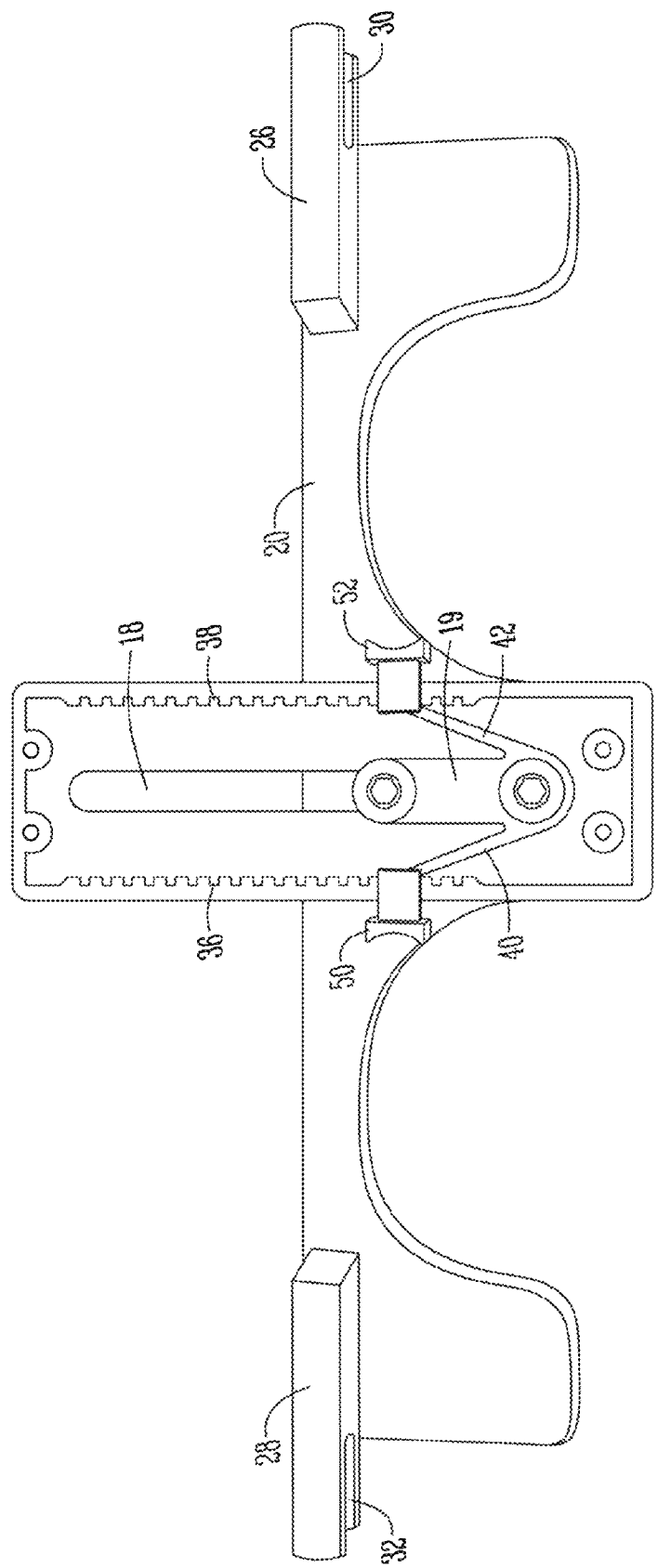
FIG. 7 is a rear view with yoke support post cover off.
Figure 8:
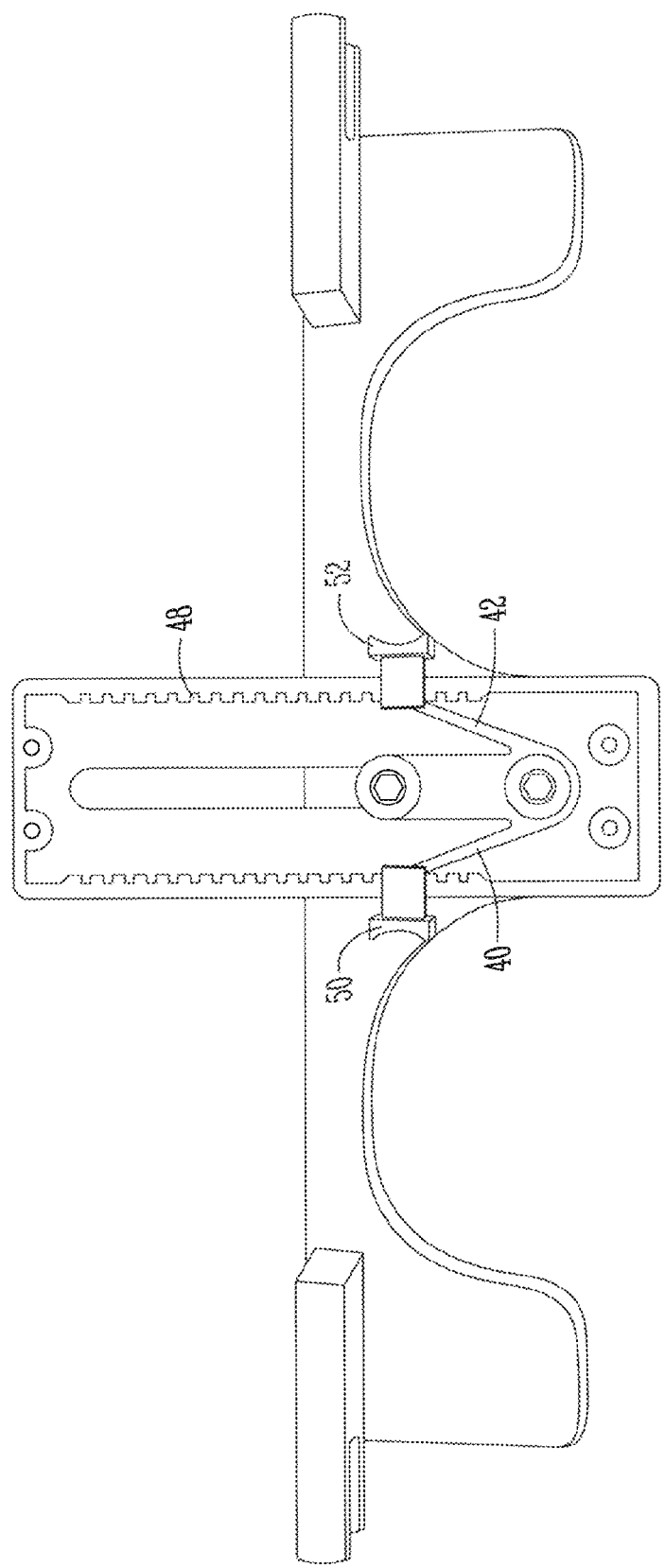
FIG. 8 is a rear view with yoke support post cover off, and with the yoke support collapsed forward.
Figure 9:
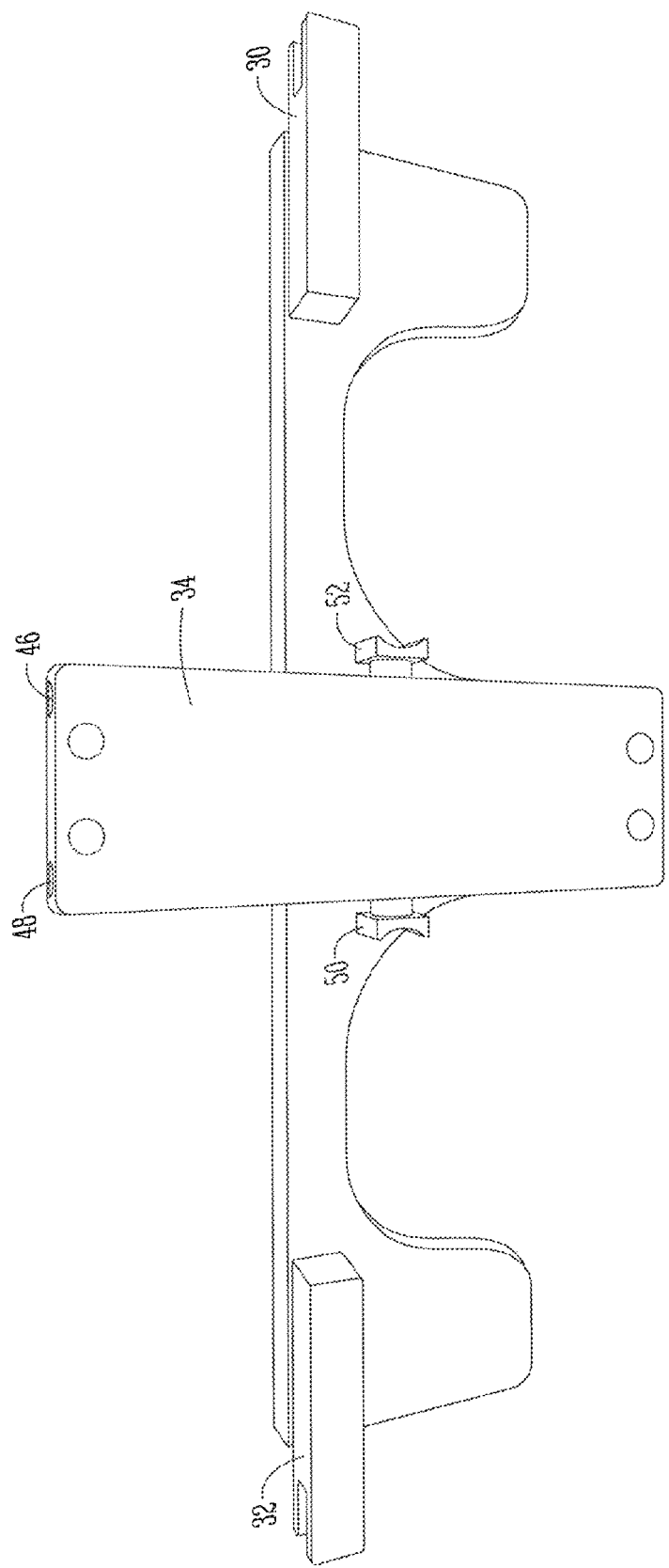
FIG. 9 shows a rear view of the device with the yoke adjusted down.

The shopping cart infant safety restraining device 10 is comprised of a yoke 12 attached to post 14 at 16 for movement up and down post 14. The yoke support post 14 has an elongated slot 18, and a plastic connector 19 (FIG. 7) attached therethrough to connect yoke 12 to post 14 in a slidable manner. Yoke 12 has thigh cutouts 22 and 24 and at its respective ends cutout blocks 30 and 32 are attached to yoke 12 for attaching it to the wire or steel frame of the shopping cart at 30, 32. The yoke support post 12 has a back cover 34 (FIG. 5) that is removable and along each side a series of slots 36, 38 (FIG. 7) for engaging notch posts (not depicted) by pushing and releasing buttons 50, 52. The spring biased levers 40 and 42 can be moved from an engaging position or unengaging position by squeezing in on slot levers 50, 52. Biased arms 40 and 42 make this spring from engaged to open. Post 34 has a cable channel 46 and 48 in each side for connecting a cable therethrough to attach the device 10 to the shopping cart in a releasable but secure manner to assist in securement.

One of the most important features of this system is how durable it is. Made of glass-filled nylon and with both ends of the restraint bar slotted to engage in the first side wire which makes it impossible to move by a stout 3 year old. Also, this system can be operated by one hand and can be "set" in less than two seconds. This unit can be installed by an average maintenance person with a Phillips screwdriver in less than two minutes.

The NoBelt replacement system eliminates the fold-down seat surface as part of the unit of my parent case and this eliminates cost. The durable plastic material last indefinitely. By being able to be snapped away from the main cart, logo instructions and possibly a greeting can be applied easily to the device.

If desired, a pressure alarm can be installed on the device to be activated by the seating of a child. This serves as a reminder to lock the restraint bar or yoke 12 down onto the child's legs.

The unit is distinguishable from U.S. Publication No. 2005/0156394 A in several important ways. Most importantly, the restraint bar or yoke does not have free ends and thus holds the child much more securely.

Figure 10:
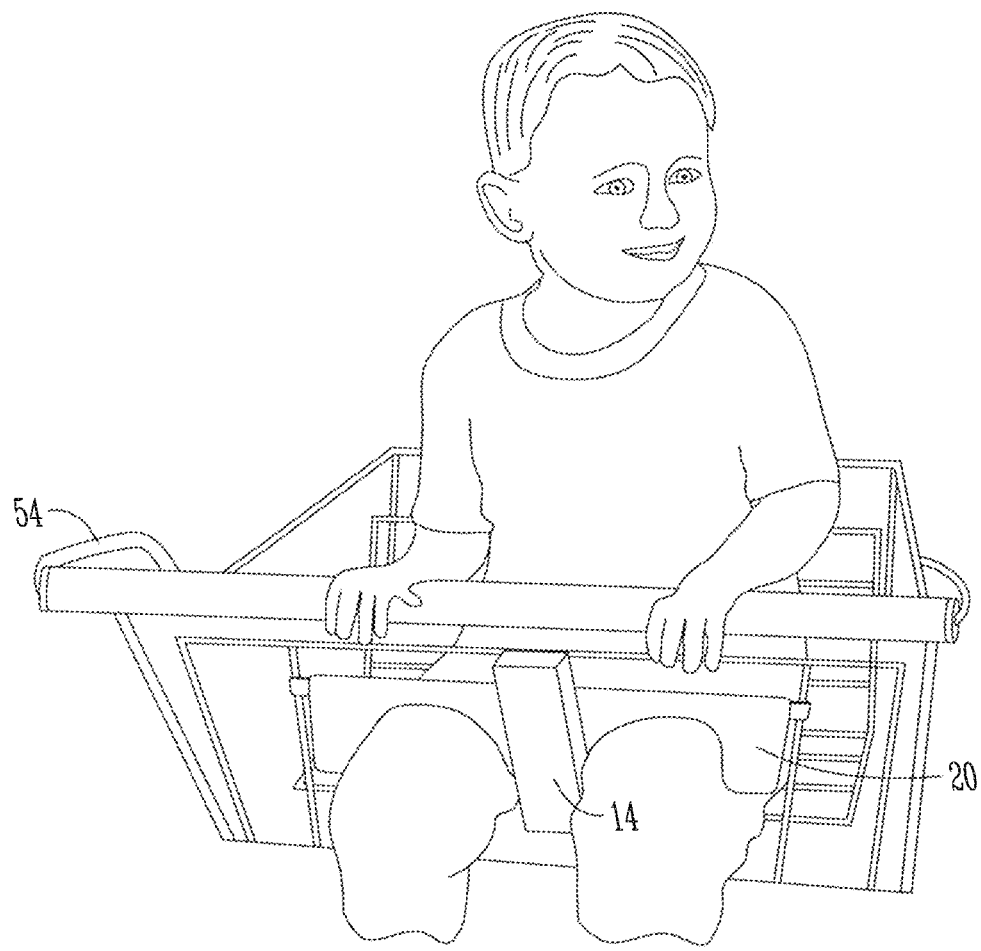
FIG. 10 shows the safety device mounted to a shopping cart with an infant fully engaged for safety.

The unit is shown in operational position with an infant in it in FIG. 10. The device 10 with yoke 12 is set in the infant seat part of the shopping cart 54 and locked to the cart at 30, 32. The post is put in an upright position and then if desired further secured with a nylon rope (not depicted). The spring buttons 50, 52 (FIG. 7) are pushed and the yoke 12 adjusted downward on the child's thighs as illustrated in FIG. 10 wherein they are released and the notch post (not shown) goes into slot 36, 38 locking the yoke 12 into position across the child's thighs. It can be seen in this manner the child is locked into position without the use of straps or any cumbersome and expensive separate car-type seat. The invention therefore accomplishes at least its stated objectives in an economical manner.

What is claimed is:

1. A shopping cart safety device, comprising:
   a support post having top and bottom ends;
   a yoke restraint adjustably connected to said support post for slidable adjustable movement up and down said support post from an engaged locked position to a released slideable position;
   spring biased lever arms to lock and unlock said yoke restraint from said engaged locked position to said released slidable position; and
   a releasable fastener to attach said yoke restraint of said safety device to a shopping cart.

2. The device of claim 1, wherein the support post has a removable cover.

3. The device of claim 1, wherein the adjustable connection of the yoke restraint to the support post is via an elongated slot in said support post with slidable releasable connectors extending therethrough.

4. The device of claim 3, wherein the releasable connectors are notched posts fitting into notches in said post.

* * * * *